United States Patent [19]

Bowling

[11] Patent Number: 5,752,008
[45] Date of Patent: May 12, 1998

[54] REAL-TIME PROCESS CONTROL SIMULATION METHOD AND APPARATUS

[75] Inventor: Jonathan S. Bowling, Georgetown, Tex.

[73] Assignee: Fisher-Rosemount Systems, Inc., Austin, Tex.

[21] Appl. No.: 654,355

[22] Filed: May 28, 1996

[51] Int. Cl.$^6$ ...................................................... G06F 3/00
[52] U.S. Cl. ...................... 395/500; 364/578; 364/188
[58] Field of Search .................................. 364/578, 188, 364/468, 200; 395/200.11, 615, 500

[56] References Cited

U.S. PATENT DOCUMENTS

| | | | |
|---|---|---|---|
| 3,719,812 | 3/1973 | Bishop et al. | 235/151.31 |
| 3,786,242 | 1/1974 | Brooks | 235/184 |
| 3,930,233 | 12/1975 | Morley et al. | 340/172.5 |
| 4,025,763 | 5/1977 | Kleiss | 235/150 |
| 4,064,392 | 12/1977 | Desalu | 364/492 |
| 4,430,699 | 2/1984 | Segarra et al. | 364/200 |
| 4,456,994 | 6/1984 | Segarra | 371/16 |
| 4,555,756 | 11/1985 | Yamanaka | 364/130 |
| 4,613,952 | 9/1986 | McClanahan | 364/578 |
| 4,629,430 | 12/1986 | Sakamoto | 434/219 |
| 4,794,534 | 12/1988 | Millheim | 364/420 |
| 4,796,194 | 1/1989 | Atherton | 364/468 |
| 4,914,567 | 4/1990 | Lipkis et al. | 364/188 |
| 4,920,481 | 4/1990 | Binkley et al. | 364/200 |
| 4,935,886 | 6/1990 | Choka | 364/578 |
| 5,202,976 | 4/1993 | Hansen et al. | 395/500 |
| 5,247,650 | 9/1993 | Judd et al. | 395/500 |
| 5,287,489 | 2/1994 | Nimmo et al. | 395/500 |
| 5,347,466 | 9/1994 | Nichols et al. | 364/492 |
| 5,412,756 | 5/1995 | Bauman et al. | 395/50 |
| 5,436,855 | 7/1995 | Willafys et al. | 364/578 |
| 5,446,868 | 8/1995 | Gardea, II et al. | 395/500 |
| 5,495,417 | 2/1996 | Fuduka et al. | 364/468 |
| 5,542,047 | 7/1996 | Armstrong | 395/200.11 |
| 5,678,044 | 10/1997 | Pastilha et al. | 395/615 |

OTHER PUBLICATIONS

A. P. Berry and T. Scheib, "Elsag Bailey DCS Based Dynamic Simulation System for Control System Tuning," *Advances in Instrumentation and Control*, vol. 50, Part 3, pp. 1389–1393, Oct. 1, 1995.

S. Horiike and Y. Okazaki, "Modeling and Simulation for Performance Estimation of Open Distributed Energy Management Systems," *IEEE Transactions on Power Systems*, vol. 11, No. 1, pp. 463–468, Feb. 1, 1996.

*Primary Examiner*—Kevin J. Teska
*Assistant Examiner*—Raymond H. Dalziel
*Attorney, Agent, or Firm*—Arnold, White & Durkee

[57] ABSTRACT

An industrial plant controller device's control algorithm is ported from a real-time proprietary operating environment (an industrial control plant) to a non-proprietary environment such as an ethernet running TCP/IP. In combination with an application programmer's interface, the invention allows manipulation of the actual device controller's control algorithms including the capability to arbitrarily stop and start the controller algorithm's operation, exercise the controller algorithm at a rate slower and faster than real-time, restore the controller algorithm to a known state, and store the configuration of the algorithm controller state. The increased fidelity provided by the invention allows an operator to design, test, and verify control system strategies in a more comprehensive manner than possible in prior art systems. An added benefit of the invention is that it can be used in an improved operator training system.

11 Claims, 3 Drawing Sheets

REAL-TIME PROCESS CONTROL SIMULATION METHOD AND APPARATUS

BACKGROUND OF THE INVENTION

The invention relates in general to the field of industrial control and, more particularly, to a method and apparatus for running control software developed to run on a process controller having a proprietary real-time operating system within a non-proprietary operating system such that the control software may be tested and modified in a non-real-time environment.

As shown in FIG. 1, a typical industrial control system 100 comprises a plant 105, at least one device controller 110, a man-machine interface (MMI) unit 115, and a proprietary communication network 120 that links the control system's different elements. (Hereinafter, the term data highway will be used to refer to the proprietary communication network 120 so as to distinguish it from an open, or non-proprietary computer network such as an ethernet running TCP/IP protocols.) The plant 105 consists of the actual machinery and/or devices that constitute the industrial system being monitored and controlled. The device controller 110 is a combination of control software 125 running within a proprietary real-time tied operating system and hardware 130 elements which, together, implement the control of a plant device or machine. The MMI 115 provides an operator interface through which the plant conditions and, in particular, the device controller 110 can be monitored and/or controlled.

One of ordinary skill in the field of industrial plant control design will recognize that an operational plant 105 will typically comprise a large number of different devices (machines) and that many of these devices will have their own device controller. It will further be understood that a device controller's 110 software 125 and hardware 130 elements are designed to monitor and control a specific device (for example, a motor or evaporator) and are limited to real-time operations. That is, because a device controller's software 125 element is designed to monitor and control a specific machine via its hardware 130 element, the device controller is limited to two operational modes: off and real-time.

To design and test either a part or the overall control of an industrial plant, as well as to train individuals to operate those plants, it is often necessary to be able to (1) arbitrarily set the configuration of a plant, (2) run the control procedures of a plant at a rate faster or slower than real-time, and (3) repeatedly cycle through a given control configuration. Plant simulation techniques have been developed to provide these capabilities without disrupting the operations of a working plant.

As shown in FIG. 2, a typical plant simulation system 200 comprises a plant model (PM) 205, at least one device controller simulator 210, a man-machine interface (MMI) unit 215, and a communication network that links the simulation system's different elements. The plant model 205 is typically a software application designed to mimic the process/plant under study and is available from a variety of vendors. The device controller simulator 210 is a software application that is designed to simulate both the device controller's software element 125 and its hardware element 130. The actual control software that would actually run on the device controller is not used in such simulation environments, but rather a program developed to mimic key performance aspects of the actual control software.

The simulation system's MMI 215 serves an analogous function as does the MMI 115 in an operational plant, that is, to monitor and control plant simulation.

By separating the simulation system 200 from the actual plant 100, the ability to arbitrarily set the plant's control configuration, or run the plant's control procedures at a rate faster or slower than real-time, or to repeatedly cycle through a given control configuration can be achieved. In addition, many plant simulators allow an operator to download control parameters 225 from the simulation system's MMI 215 to a device controller 110. (This latter feature must account for the control system's proprietary communication network or data highway 120.)

The device controller simulator 210 comprises a software design engineer's "best guess" replication of the control device's operational characteristics and environment. That is, the device controller simulator 210 is comprised of computer program code that attempts to mimic the controller's actual software control algorithms 125 and the operation or interaction of the software control algorithms with the controller's hardware element 130 and underlying proprietary operating system (i.e., the software environment in which a device controller's software element 125 executes) while also providing the ability to run the control algorithm in non-real-time. Because both the actual hardware element 130 and the interactions between the device controller's hardware element 130 and software element 125 are complex, the simulator can not realistically accomplish this goal. As a result, the device controller simulator 210 only roughly approximates the behavior of the actual device controller 110; the device controller simulator 210 has a lower than desired fidelity in its ability to model the actual/real device controller 110. Such rough approximations may be of limited utility in designing and testing process control systems, and training individuals to run such systems, because of the unrealistic, estimated nature of such "best guess" systems.

SUMMARY OF THE INVENTION

A method and apparatus in accordance with the invention overcomes the fidelity problems associated with device control simulators by using, in a non-proprietary operating system environment, the actual control algorithm program code of a target device controller. In addition, the invention provides an API (application program interface) to exercise the control algorithm program code. The API is designed to allow the actual device controller software to operate in a non-proprietary communication's environment while also providing the capability to arbitrarily stop and start the controller software's operation, exercise the controller software at a rate slower and faster than real-time, restore the controller software to a known state, and store the configuration of the software controller state.

The invention provides a very high fidelity simulation of a control device while avoiding the need for users to design/engineer around their current control system's proprietary communication's network or data highway. The increased fidelity provided by the invention allows an operator to design, test, and verify control system strategies in a more comprehensive manner than possible in prior art systems. An added benefit of the invention is that it can be used as an improved operator training system.

DETAILED DESCRIPTION OF A SPECIFIC EMBODIMENT

For purposes of illustration, a specific embodiment of the invention is described below. It will be appreciated that in the development of any such actual implementation (as in any engineering design and development project), numerous implementation-specific decisions must be made to achieve the developers' specific goals, which will vary from one implementation to another. Moreover, it will be appreciated that such a development effort might be complex and time-consuming, but would nevertheless be a routine undertaking of control systems design for those of ordinary skill having the benefit of this disclosure.

Overview

Figure 1:
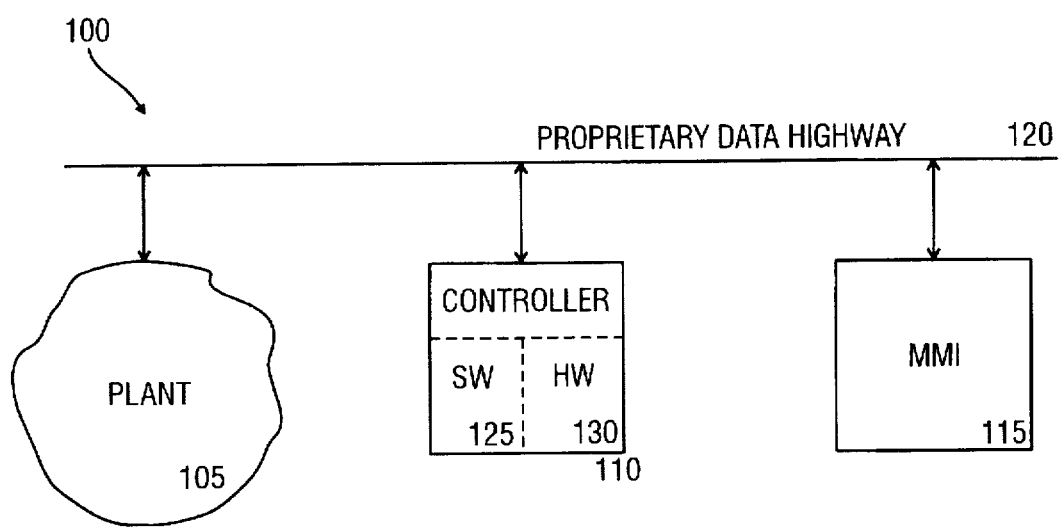
FIG. 1 shows a simplified schematic diagram of a prior art industrial control system.
Figure 2:
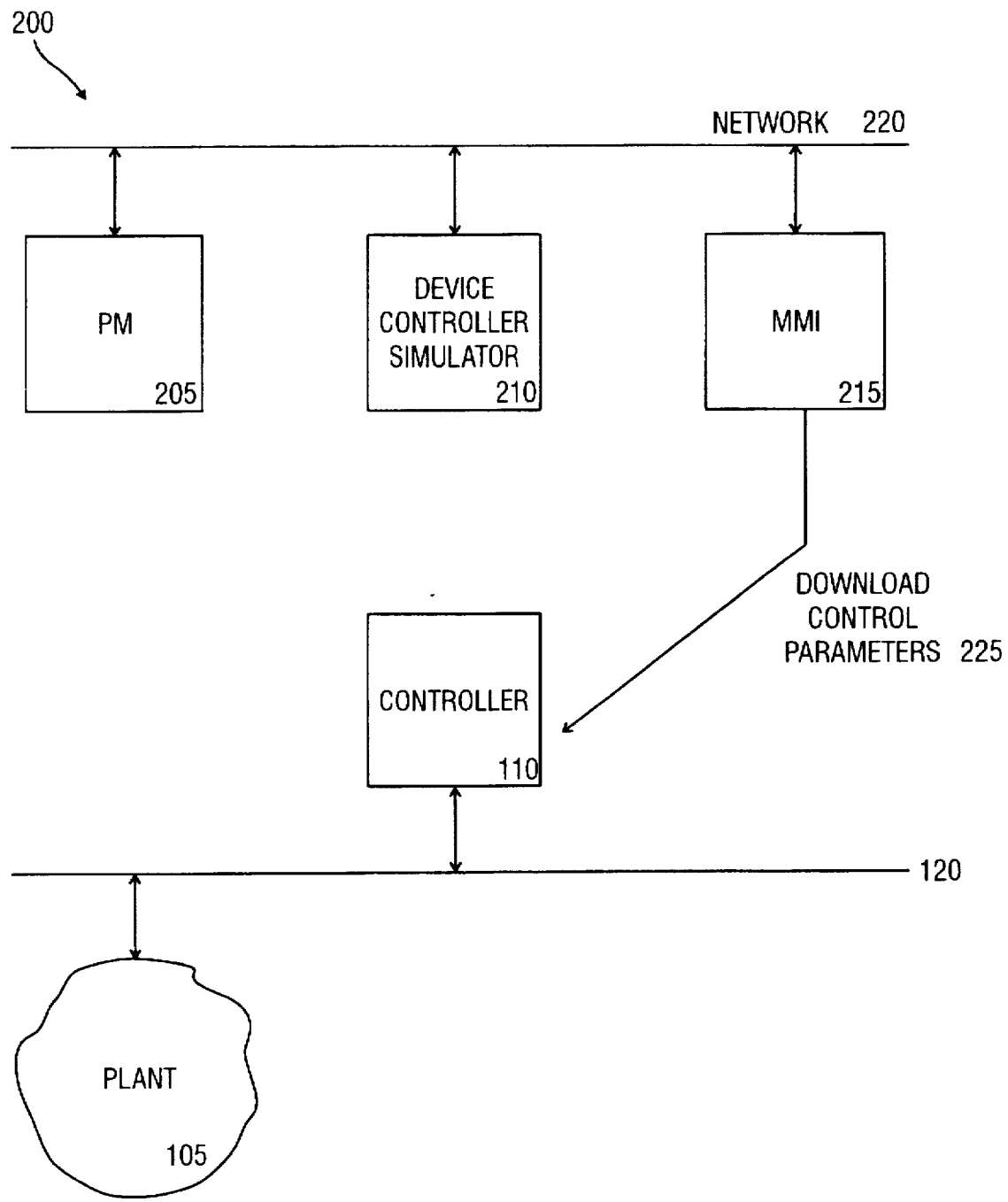
FIG. 2 shows a simplified schematic diagram of a prior art industrial control plant simulation system.
Figure 3:
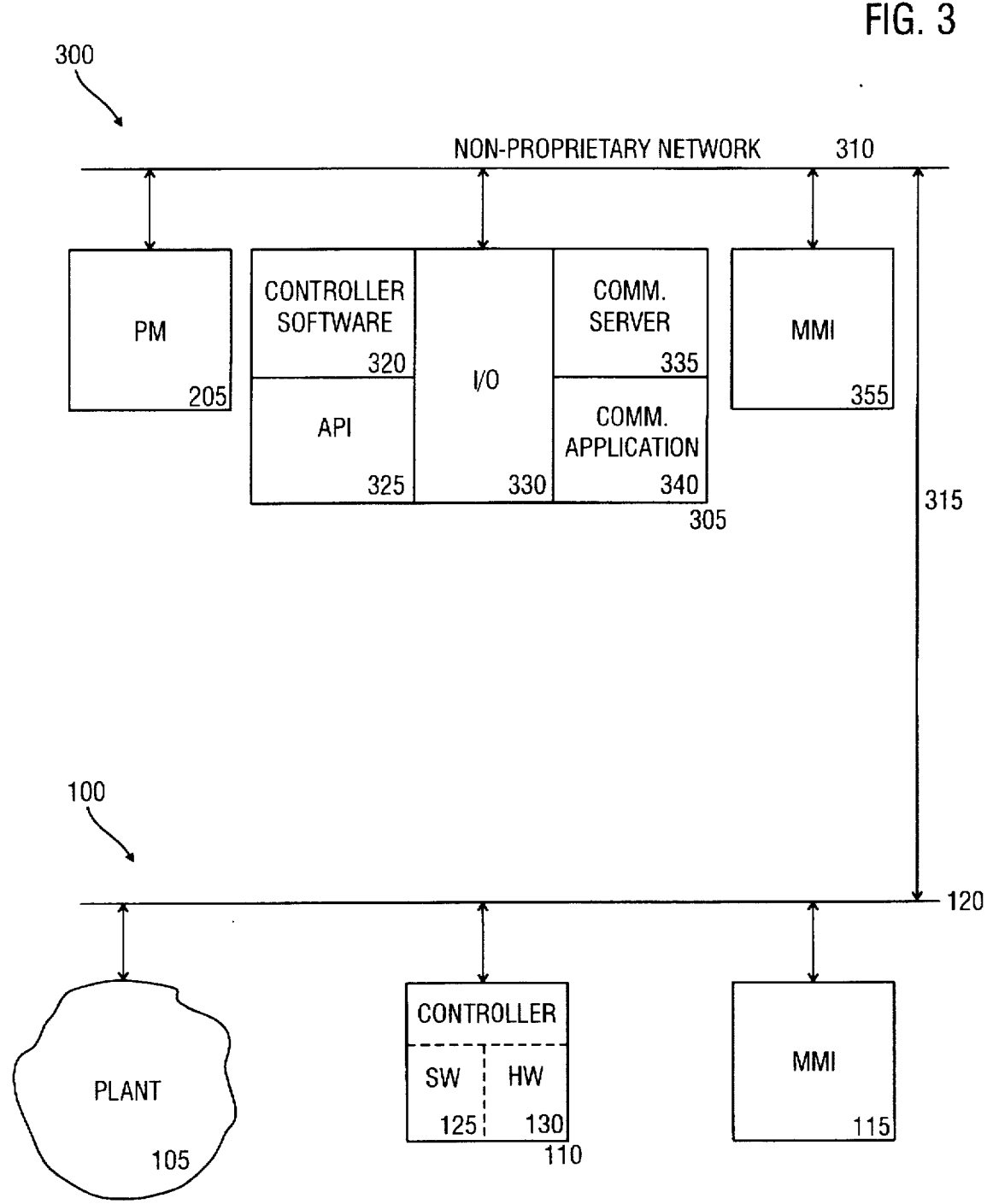
FIG. 3 shows a simplified schematic of an industrial control plant emulation system in accordance with the invention.

As shown in FIG. 3, an industrial control system 300 in accordance with the invention is comprised of a process model (PM) 205, a simulation engineering environment unit 305, a MMI (man-machine interface) unit 355, and a non-proprietary network 310 connecting these elements together. In addition, a communication link 315 from non-proprietary network 310 to the industrial control system's 100 proprietary network or data highway 120 can be provided. The simulation unit 305 is comprised of controller software 320, an API (application program interface) 325, a means to process I/O (input/output) 330 to and from the simulation unit, a communications server 335, and a communications application 340.

The simulation unit 305 may be housed in a single VME chassis which provides backplane communication between each of the unit's functional elements, 320 through 340 which can be implemented on VME cards. In addition, an illustrative simulation unit 305 executes under a standard operating system (such as, for example, "UNIX," "WINDOWS NT," or "Open VMS") to provide communications capability to the non-proprietary network 310 via the TCP/IP communication's protocol.

In addition, a simulation unit 305 in accordance with the invention could also contain one or more storage means such as, for example, magnetic hard disks, magnetic tape units, or any other suitable storage device. Such tape drives may be used to allow the simulation unit 305 to read/write "configuration tapes" readable by the control software 320, that contain configuration data used by the control software 320 to implement various control processess.

Further, each simulation unit 305 may also comprise an operator console including a video display, keyboard, and a suitable input/output device. Each of the simulation unit's 305 other elements (controller software 320, API 325, communication's server 335, and communication's application 340 will be described in more detail below.

Plant model 205 can be either a stand-alone element or incorporated within the simulation unit 305.

Controller Software and API

The simulation unit's controller software 320 is a direct port of a device controller's 110 software control algorithms/ program code 125 so that it executes in a non-proprietary operating system such as, for example, "UNIX" or "VMS." One of ordinary skill in the field of software design will recognize that because the controller software 320 is a direct port of the actual device controller software 125 it is not a simulation or emulation—the controller software 320 responds to data input in precisely the same way as the actual device controller software 125.

The precise form that the ported control software will take will depend on the nature of the control software prior to rehosting on the simulation unit 305. In one embodiment the software comprises a rehosted version of the PROVOX process management software available from Fisher-Rosemount Systems, Inc., the assignee of the present invention. In this embodiment, the ported control software could comprise ported versions of: the SRx controller software; operator workplace console software to provide a graphical interface for the user; configuration software for configuring the various control devices; shared memory applications; external I/O interface software; a highway data link server; and an API library for software manipulation applications. Alternate embodiments are envisioned wherein other process management software, e.g., the RS3 software available from the assignee of the present invention, are rehosted on to the simulation unit 305.

Standard porting and re-hosting techniques may be used to rehost the control software from the real-time tied operating system to the non-real-time tied, non-proprietary operating system running on simulation unit 305. Such techniques may involve the creation of software "layers" that surround the re-hosted control software and act as intermediaries between the re-hosted software and the non-proprietary, non-real-time tied operating system running on the simulation unit. The precise form and number of layers that may be required to accomplish the port will depend on the nature of the original control software and on the specific non-proprietary, non-real-time tied operating system running on simulation unit 305. One of ordinary skill in the art having the benefit of this disclosure should be able to port original control software to a non-proprietary operating system without undue experimentation.

The API 325 is a function library that allows manipulation of the controller software algorithms 320, including: (1) freeze/unfreeze (e.g., start/stop) capability, (2) store/restore capability, (3) fast/slow execution capability, relative to real-time (e.g., ¼ time, ½ time, 2X time 3X time, 4X time, and 5X time), and (4) the insertion/retrieval of controller values such as setpont, pv, and controller tuning constraints. In particular, the API 325 is used to communicate with the controller software 320 in the same manner as prior art systems communicate (i.e., pass information) with control device simulators 210. In one embodiment the API 325 is written in the C programming language.

A significant feature of the controller software 320—API 325 combination is that it provides an operator with the capability to exercise an actual control device's software algorithms in non-real-time and in a platform (computer system) independent manner; that is, at rates both slower and faster than real-time. This capability flows from the fact that the control software algorithms 320 are functionally identical to those run in the actual control plant (i.e., 125). Thus, an operator can, with very high fidelity, verify plant operating procedures, test new plant operating procedures, and train in an environment which more accurately reflects the behavior of an operational control plant 105.

The API 325 also provides a set of function calls by which the MMI 355 communicates with the simulation unit 305 as well as function calls to allow the communication server 335 to interact with both the system's non-proprietary network 310 and the real-time proprietary data highway 120. Both the MMI 355 and communication server 335 is discussed in more detail below.

Communication Server

The communication server 335 provides a means for two-way communication between the simulation unit 305 and the industrial plant's 105 data highway 120. Because each vendor's data highway network is proprietary, the precise implementation of this element will depend upon the type of control network being used.

Those of ordinary skill in the art of computer communication network design will recognize that the communication server 335 provides functions such as the capability to receive, process, and transmit messages for the purposes of establishing, verifying, and releasing one or more communication ports (e.g., TCP/IP sockets) between the nonproprietary 310 and proprietary 120 computer networks. Self-testing capability is another common feature of cross-network communication servers.

One benefit of the communication server 335 is the ability to provide the plant model (PM) 205 and the controller software 320 with real-time information about the operational plant's 105 behavior. This data can be used to compare, update, and correct the PM's 205 operation. Additionally, plant configuration data from an operational plant 105 can be obtained via the communication server 335 to establish a baseline for future simulation. Further, the communication server 335 can be used to transfer configuration and control information from the simulation unit 305 to an operational control plant's 105 device controller 110. Thus, a control routine or process may be developed and refined through the use of the simulation unit 305 and then downloaded to the controller 110. This potentially minimizes the downtime normally associated with such development and may reduce the potential for introducing errors into an operational industrial control system 100.

Communication's Application

The communication application 340 provides a means for each of the individual components of the simulation unit 305 to communicate with one another and the ability of the MMI 355 to communicate with each of the individual components of the simulation unit 305. (In one embodiment, all communication is in binary file format utilizing big endian/little endian byte swapping, and all data is handled in I.E.E.E. floating point format.)

In an illustrative implementation, the communication's application 340 is implemented as a shared memory application. In this embodiment, the MMI 355 reads and writes to the shared memory application which is then responsible for notifying the other simulation unit 305 elements that new data and/or commands have been received. Alternatively, each of the other simulation unit 305 elements can be designed to periodically query or inspect the status of the communication's application 340. Further, it is via the communication's application 340 that information is transferred between the simulation unit's 305 individual elements on the VME backplane.

MMI Unit

A MMI unit 355 in accordance with the invention is essentially the same as prior art MMI units 215 with the exception that it has been modified to allow it to communicate with the simulation unit's 305 communication application 340. As such, the MMI 355 will typically have a graphical display and appropriate input/output device (such as, for example, a mouse), a keyboard, and a graphical user interface.

Program Storage Device

Any of the foregoing variations may be implemented by programming a suitable general-purpose computer that has the requisite network connections. The programming may be accomplished through the use of a program storage device readable by the computer and encoding a program of instructions executable by the computer for performing the operations described above. The program storage device may take the form of, e.g., one or more floppy disks; CD ROMs or other optical disks; magnetic tapes; read-only memory chips (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

Comments

Some of the benefits provided by the invention include the ability to exercise the actual control algorithms used in an operational plant in non-real-time. This, in turn, allows for advanced and accurate evaluation of control plant operating and training procedures.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. An improved process control system comprising:

a first communications network utilizing a first communications protocol;

a real-time device controller coupled to the first communications network, the real-time device controller comprising a digital processor running a first operating system and process control software, the hardware and operating system of the real-time device controller allowing the process control software to run only in a real-time mode;

a second communications network utilizing a second communications protocol, the second communications network being coupled to the first communications network by a communications link; and a simulation unit coupled to the second communications network, the simulation unit comprising a digital processor running a second operating system and a version of the process control software that has been rehosted to run in conjunction with the second operating system.

2. The system of claim 1 wherein the second operating system is not a real-time tied operating system and where a user can cause the rehosted software to run at a rate that is faster than real-time.

3. The system of claim 1 wherein the second operating system is not a real-time tied operating system and where a user can cause the rehosted software to run at a rate that is slower than real-time.

4. The system of claim 1 wherein a user can freeze execution of the rehosted software.

5. The system of claim 1 wherein the first communications protocol is a proprietary protocol and wherein the second communications protocol is a non-proprietary protocol.

6. The system of claim 1 wherein the first operating system is a proprietary operating system and wherein the second operating system is a non-proprietary operating system.

7. The system of claim 6 wherein the second operating system is UNIX.

8. A simulation unit for running plant process control software originally written to run in conjunction with a first real-time tied operating system, the simulation unit comprising:

a digital processor;

a second operating system running on said digital processor; and a version of the plant process control software that has been rehosted to run in conjunction with the second operating system.

9. The simulation unit of claim 8 wherein the second operating system is not tied to real-time.

10. The simulation unit of claim 8 wherein the second operating system is UNIX.

11. The simulation unit of claim 9 wherein the second operating system is Windows-NT.

* * * * *